United States Patent [19]

Joyce et al.

[11] Patent Number: 5,051,490
[45] Date of Patent: Sep. 24, 1991

[54] THERMOPLASTIC POLYARYLATE COMPOSITIONS HAVING IMPROVED OXYGEN BARRIER PROPERTIES

[75] Inventors: Richard P. Joyce, East Nassau; John C. Schmidhauser, Schenectady; Kathryn L. Longley, Saratoga Springs, all of N.Y.

[73] Assignee: General Electric Company, Schenectady, N.Y.

[21] Appl. No.: 588,504

[22] Filed: Sep. 25, 1990

Related U.S. Application Data

[63] Continuation of Ser. No. 375,106, Jul. 3, 1989, abandoned.

[51] Int. Cl.$^5$ .................. C08G 63/02; C08G 63/18
[52] U.S. Cl. ................................ 528/190; 528/176; 528/271
[58] Field of Search .................. 528/176, 190, 271

[56] References Cited

U.S. PATENT DOCUMENTS

| 2,739,171 | 3/1956 | Linn | 528/176 |
| 2,999,835 | 9/1961 | Goldberg | 528/176 |
| 3,028,365 | 4/1962 | Schnell et al. | 528/176 |
| 3,133,898 | 5/1964 | Keck | 528/272 |
| 3,148,172 | 9/1964 | Fox | 528/176 |
| 3,216,970 | 11/1965 | Conix et al. | 528/193 |
| 3,317,646 | 5/1967 | Conix | 528/176 |
| 3,334,154 | 8/1967 | Kim | 528/176 |
| 3,780,148 | 12/1973 | Jackson, Jr. et al. | 528/176 |
| 3,824,213 | 7/1974 | Stackman | 528/176 |
| 3,946,091 | 3/1976 | Sakata et al. | 528/176 |
| 3,948,856 | 4/1976 | Stackman | 528/176 |
| 4,052,481 | 10/1977 | Asahara et al. | 528/193 |
| 4,126,602 | 11/1978 | Salee | 528/176 |
| 4,131,575 | 12/1978 | Adelmann et al. | 528/176 |
| 4,304,899 | 12/1981 | Mark et al. | 528/171 |
| 4,485,230 | 11/1984 | Yu | 528/125 |
| 4,727,134 | 2/1988 | Brunelle et al. | 528/371 |
| 4,769,403 | 9/1988 | Luise | 523/435 |
| 4,775,717 | 10/1988 | Ishihara | 525/67 |
| 4,788,248 | 11/1988 | Maresca et al. | 525/66 |

FOREIGN PATENT DOCUMENTS 0175205 3/1986 European Pat. Off. ............ 528/176

OTHER PUBLICATIONS

H506–Asada et al., "Resinous Composition and Process for Producing Shaped Articles Using Same", Osaka, Japan.

Primary Examiner—John Kight, III
Assistant Examiner—T. Mosley
Attorney, Agent, or Firm—William H. Pittman; James C. Davis, Jr.

[57] ABSTRACT

Aromatic thermoplastic polyarylates containing structural units derived from a bisphenol of cyclohexanone, preferably 1,1-bis(4-hydroxy-3-methylphenyl)cyclohexane, and an aromatic dicarboxylic acid or mixture of such acids, are provided which exhibit improved oxygen barrier properties.

12 Claims, No Drawings

THERMOPLASTIC POLYARYLATE COMPOSITIONS HAVING IMPROVED OXYGEN BARRIER PROPERTIES

This application is a continuation of application Ser. No. 07/375,106, filed July 3, 1989, abandoned.

BACKGROUND OF THE INVENTION

This invention relates to aromatic thermoplastic polyarylate compositions. More particularly, this invention relates to aromatic thermoplastic polyarylate compositions having improved oxygen barrier properties.

Polyarylates based on bisphenol A are a class of high performance polyesters possessing several attractive properties such as high impact strength, outstanding thermal properties, and processability, which make the polyarylates useful in a wide range of applications. However, polyarylates also have inherently high gas permeability which limits their usefulness in applications requiring low oxygen transmission rates, for example, in formed containers and film wraps for perishable foods and beverages.

It is desirable, therefore, to provide polyarylates with improved oxygen barrier properties for use in such applications.

SUMMARY OF THE INVENTION

It has been found that thermoplastic aromatic polyarylates which contain structural units derived from a bisphenol of cyclohexanone, while comparable in glass transition temperature and capacity to form clear ductile films to polyarylate compounds containing structural units derived from bisphenol A, are superior to the bisphenol A-based polyarylates in oxygen barrier properties.

The polyarylate compounds of this invention contain recurring structural units of the general formula

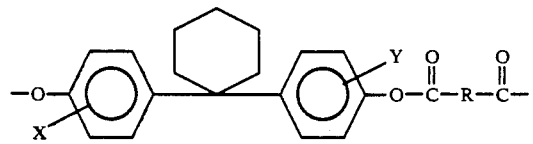
(I)

wherein R is a divalent aromatic radical, two or more divalent aromatic radicals connected through non-aromatic linkages, or a divalent aliphatic-aromatic radical and X and Y are each independently selected from the group consisting of hydrogen, an alkyl group having 1 to about 5 carbon atoms, a cycloalkyl group having about 5 to about 7 carbon atoms, a monovalent aromatic group, and a halogen.

DETAILED DESCRIPTION OF THE INVENTION

The present invention is directed to polyarylate compositions having improved oxygen barrier properties.

These compositions can be prepared according to known methods for preparing polyesters. Such methods are disclosed, for example, in U.S. Pat. Nos. 4,769,403; 3,317,646; 3,948,856; 3,780,148; 3,824,213; and 3,133,898, all of which are incorporated by reference herein in their entirety.

In general, the polyarylate compositions of this invention are the reaction product of a bisphenol of cyclohexanone or a functional derivative thereof and an aromatic dicarboxylic acid or a reactive derivative thereof.

Functional derivatives of the cyclohexanone bisphenols which can be used herein include the alkali metal salts and diesters with an aliphatic monocarboxylic acid containing 1 to 3 carbon atoms. Suitable aliphatic monocarboxylic acids include formic acid, acetic acid, propionic acid, and the like. The preferred functional derivatives are the sodium salts, the potassium salts, and the diacetate esters.

As mentioned previously herein, X and Y in Formula (I) above independently represent hydrogen; an alkyl group having 1 to about 5 carbon atoms, e.g., methyl, ethyl, and the like; a cycloalkyl group having about 5 to about 7 carbon atoms, e.g., cyclopentyl, cyclohexyl, and the like; a monovalent aromatic group; and a halogen, e.g., chlorine, fluorine and the like.

Preferred cyclohexanone bisphenol monomers are the dimethyl cyclohexanone bisphenols, in which case X and Y in formula (I) are both methyl groups.

For purposes of the present invention, the preferred dimethyl bisphenol of cyclohexanone is 1,1-bis(4-hydroxy-3-methylphenyl)cyclohexane, which has been found to provide superior barrier properties as compared to other bisphenols of cyclohexane. This monomer has the formula

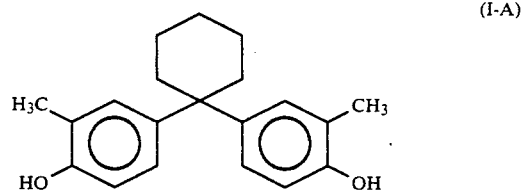
(I-A)

This compound has been described previously, for example, in U.S. Pat. No. 4,304,899 for use in preparing aromatic polycarbonate compositions having improved barrier properties.

Accordingly, the preferred polyarylate compositions are those wherein X and Y are methyl groups in the 3,3' positions of the aromatic rings with respect to the cyclohexylidene group.

Aromatic dicarboxylic acids useful herein have the formula

HOOC—R—COOH, (I—B)

wherein R is as defined previously herein, i.e., a divalent aromatic radical such as phenylene, naphthalene, biphenylene, substituted phenylene and the like; two or more divalent aromatic groups connected through non-aromatic linkages such as, for example, a hydrocarbon linkage, a tertiary amino linkage, an ether linkage, a carbonyl linkage, a silicon-containing linkage, or by a sulfur-containing linkage such as a sulfide, sulfoxide, sulfone, and the like; or a divalent aliphatic-aromatic hydrocarbon radical such as an arylalkyl or alkylaryl radical. Preferably, R is a divalent aromatic group.

In general, the aromatic dicarboxylic acids or reactive derivatives thereof useful in preparing the polyarylates of this invention may be any aromatic dicarboxylic acid or its reactive derivatives conventionally used in the preparation of polyesters. The term "reactive derivatives" as used herein refers to those derivatives which under the reaction conditions herein react as the parent acid. Examples of such derivatives include acid halides and aryl esters.

Suitable aromatic dicarboxylic acids include aliphatic-aromatic dicarboxylic acids, in addition to the wholly aromatic dicarboxylic acids. Wholly aliphatic dicarboxylic acids may comprise a small percentage of the dicarboxylic acid component but should not be used to such a degree that the desirable characteristics associated with aromatic dicarboxylic acids will be substantially reduced. It has been found that the aromatic dicarboxylic acids or their reactive derivatives such as the aromatic diacid halides or aryl esters, produce polyarylate resins which are most desirable from the standpoint of physical properties such as high heat resistance.

For purposes of the present invention, the aromatic dicarboxylic acids or their reactive functional derivatives, such as for example, the acid halides or diphenyl esters, are preferred. Thus, in the preferred aromatic dicarboxylic acids, as represented above, R is an aromatic radical such as phenylene, biphenylene, naphthylene, substituted phenylene, and the like.

Suitable aromatic dicarboxylic acids include phthalic acid, isophthalic acid, terephthalic acid, homophthalic acid, and the polynuclear aromatic acids such as diphenyl dicarboxylic acid and isomeric naphthalene dicarboxylic acids. The preferred dicarboxylic acids are terephthalic acid and isophthalic acid.

Preferred acid halides of the aromatic dicarboxylic acids suitable for use herein include terephthaloyl dichloride, isophthaloyl dichloride, terephthaloyl dibromide and isophthaloyl dibromide. Preferred diaryl esters include diphenyl terephthalate and diphenyl isophthalate.

Thus, in preferred embodiments, R in Formula (I) above is a meta-phenylene or para-phenylene group.

The aromatic dicarboxylic acids or their reactive functional derivatives can be used individually or as mixtures of two or more different acids or derivatives.

The preferred acid component for use in preparing the polyarylates of this invention is a mixture of terephthalic acid and isophthalic acid and/or the functional reactive derivatives of these acids. The acid mixture should contain about 99 to about 1 mole%, preferably about 1 to about 50 mole%, and most preferably about 1 to about 20 mole%, terephthalic acid and/or its reactive functional derivatives, and about 1 to about 99 mole%, preferably about 50 to about 99 mole% and most preferably about 80 to about 99 mole% isophthalic acid and/or its functional derivatives.

Accordingly, in preferred embodiments, about 1 to about 99 mole percent, preferably about 1 to about 50 mole percent, and most preferably about 1 to about 20 mole percent, of the total R groups will be para-phenylene, and about 99 to about 1 mole percent, preferably about 50 to about 99 mole percent, and most preferably about 80 to about 99 mole percent, of the total R groups will be metaphenylene.

In preparing the polyarylates of the present invention, the cyclohexanone bisphenol monomer may be used in admixture with at least one aromatic bisphenol compound. Any of several dihydric phenol compounds known to be useful in the preparation of polyarylates may be used herein, depending on the particular properties of the polyarylate desired and end uses contemplated.

Examples of suitable dihydric phenol compounds are described, for example, in U.S. Pat. Nos. 4,727,134, 4,788,248 and 4,775,717. These include bis(4-hydroxyphenyl)methane; 1,1-bis(4-hydroxyphenyl)ethane; 1,1-bis(3-methyl-4-hydroxyphenyl)ethane; 2,2-bis(4-hydroxyphenyl)propane ("bisphenol A"); 2,2-bis(3-methyl-4-hydroxyphenyl)propane; 2,2-bis(3,5-dimethyl-4-hydroxyphenyl)propane; 3,3-bis(4-hydroxyphenyl)pentane; 1,1-bis(4-hydroxyphenyl)cyclohexane; and bis(4hydroxyphenyl)sulfide.

Other suitable dihydric phenol compounds include dihydroxybenzenes typified by hydroquinone and resorcinol; dihydroxydiphenyls such as 4,4'-dihydroxydiphenyl; 2,2'-dihydroxydiphenyl; 2,4'-dihydroxydiphenyl; dihydroxynaphthalenes such as 2,6-dihydroxynaphthalene, and the like.

Dihydroxy aromatic ethers such as those described in U.S. Pat. No. 3,148,172 are also useful as a dihydric phenol component herein. The dihydroxy aromatic ethers may be prepared as described in U.S. Pat. No. 2,739,171.

Other dihydric phenols suitable for the preparation of the polyarylates of the present invention are disclosed in U.S. Pat. Nos. 2,999,835; 3,028,365; 3,334,154; and 4,131,575.

For reasons of availability bisphenol A is the preferred dihydric phenol.

Thus, the polyarylate composition may further contain recurring structural units of the general formula

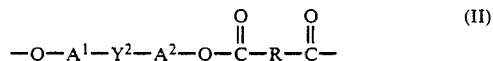

(II)

wherein each of $A^1$ and $A^2$ is a monocyclic divalent aromatic radical, $Y^2$ is a bridging radical in which one or two atoms separate $A^1$ from $A^2$, and R is as previously defined. The free valence bonds in formula (II) are usually in the meta or para positions of $A^1$ and $A^2$ in relation to $Y^2$.

In formula (II), the $A^1$ and $A^2$ groups may be unsubstituted phenylene or substituted derivatives thereof, illustrative substituents (one or more) being alkyl, alkenyl, halo (especially chloro and bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, $Y^2$, is one in which one or two atoms, preferably one, separate $A^1$ from $A^2$ It is most often a hydrocarbon radical and particularly a saturated radical such as methylene, cyclohexylmethylene, 2-(2.2.1)bicycloheptylmethylene, ethylene, isopropylidene, neopentylidene, cyclohexylidene, cyclopentadecylidene, cyclododecylidene or adamatylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. Preferably $Y^2$ represents an isopropylidene radical.

In the polyarylate compositions of this invention, the molar proportion of structural units of formula (I) is at least about 1 mole percent, generally in the range of about 1 to about 100 mole percent, preferably in the range of about 50 to about 100 mole percent, and most preferably in the range of about 80 to about 100 mole percent, based on total structural units of Formulas (I) and (II).

As mentioned hereinabove, any of the known methods for preparing polyesters can be used to prepare the polyarylates of this invention.

A preferred method for preparing the polyarylates is the interfacial polymerization process which comprises mixing a solution of an aromatic dicarboxylic acid chloride in a water-immiscible organic solvent with an alkaline aqueous solution of the cyclohexanone bisphenol. Generally, polycondensation of the acid chloride derivatives with cyclohexanone bisphenol is carried out at ambient temperature in an inert solvent. Preferably, the reaction is conducted in the presence of a basic catalyst and an acid acceptor.

Suitable organic solvents for use in the interfacial polymerization method include the halogenated aliphatic solvents, such as methylene chloride, chloroform, methylene bromide, 1,1,2-trichloroethane, and the like. Other suitable solvents include cyclic ethers such as tetrahydrofuran, dioxane, and the like.

Basic catalysts useful in the interfacial process include quaternary ammonium salts and tertiary amines. Suitable quaternary ammonium salts include tetraalkylammonium halides containing a total of about 15-30 carbon atoms, such as triethylbenzylammonium chloride, tetra-n-butylammonium bromide, and methyl trioctylammonium chloride. Examples of useful tertiary amines are alkyl amines such as trimethylamine, triethylamine, tripropylamine, diethylpropylamine, tributylamine, and the like; alkylaryl amines such as N,N-dimethylaniline, N,N-diethylaniline, N,N-dimethylnaphthylamine, benzyldimethylamine, alphamethylbenzyldimethylamine; and heterocyclic amines such as pyridine and 4-dimethylaminopyridine.

The preferred tertiary amine catalyst is triethylamine because of its availability and particular suitability for purposes of this method. The quaternary ammonium salts are preferred to the tertiary amines as catalysts because of the ability of the ammonium salts to function as phase transfer catalysts which facilitates the interfacial polycondensation reaction.

The catalyst is present in a catalytically effective amount which is that amount sufficient to promote the interfacial polycondensation reaction. Generally, the catalyst should be present in an amount ranging from about 0.1 to about 10, and preferably about 0.25 to about 3.0, mole percent based on the moles of total bisphenol monomers present.

Suitable acid acceptors include alkali metal hydroxide compounds such as sodium hydroxide and potassium hydroxide, and alkaline earth metal hydroxides compounds such as barium hydroxide, calcium hydroxide, strontium hydroxide, magnesium hydroxide, and beryllium hydroxide.

Another method which can be used to prepare the polyarylates of this invention is a solution polymerization method wherein the cyclohexanone bisphenol and a diacid dichloride are heated in a high boiling solvent at temperatures up to and exceeding 150° C.

Suitable solvents for use in the solution polymerization method include 1,2,4-trichlorobenzene, o-dichlorobenzene, 1,2,3-trichlorobenzene, diphenyl ether, diphenyl sulfone, benzoic acid alkyl esters, phenolic ethers and the like.

Melt polymerization methods may also be used to prepare the polyarylate compounds of this invention. These methods comprise heating a diphenyl ester of an aromatic dicarboxylic acid and a cyclohexanone bisphenol, or heating an aromatic dicarboxylic acid and a diester of a cyclohexanone bisphenol, for example, the diacetate ester. Suitable melt polymerization methods are described, for example, in U.S. Pat. Nos. 4,769,403; 3,884,990; 3,946,091; 4,052,481 and 4,485,230.

If desired, for example, to change the reactivity and possibly the stability of the polyarylate, the molecular weight of the polyarylates obtained can be limited by the use of a chain stopper. Examples of compounds useful as chain stoppers herein include monohydric phenols or their derivatives, such as p-phenylphenol and the like, and monofunctional carboxylic acids, or their derivatives, such as the arylester of benzoic acid.

The following detailed examples will serve to more fully illustrate the practice of preferred embodiments of the present invention.

In the examples below, a series of 1,1-bis(4-hydroxy-3-methylphenyl)cyclohexane (hereinafter referred to as "DMBPC") containing polyarylates were prepared in an interfacial polymerization process. The detailed procedure for Example 3 illustrates this process. DMBPC (3.21 grams, 10.8 millimoles) and triethylbenzylammonium chloride ($5.0 \times 10^{-2}$ grams, 0.22 millimoles) were added in one portion to a rapidly stirred solution of sodium hydroxide (1.00 grams, 25.0 millimoles) in 25 milliliters of water. After 45 minutes, the mixture was cooled to 0° C., and a solution of isophthaloyl dichloride (1.00 grams, 4.96 millimoles) and terephthaloyl dichloride (1.00 grams, 4.96 millimoles) in 25 milliliters of methylene chloride was added dropwise to the mixture for over 2 minutes. The biphasic mixture was warmed to room temperature and stirred for 90 minutes. After dilution with 25 milliliters of methylene chloride, the organic phase was separated and washed twice with 5% aqueous hydrochloric acid and four times with water. The polymer was isolated by antisolvent precipitation into two volumes of acetone/methanol. The product was filtered as a white powder, which was dried in vacuo to yield DMBPC polyarylate.

In measuring oxygen permeability, solutions of the polyarylates (2.0 grams) in methylene chloride (30 milliliters) were filtered through a 0.5 micrometer filter onto glass plates fitted with 4 inch diameter glass casting rings. Solvent was allowed to diffuse from the covered samples for 24 hours, after which the covered samples were dried in a vacuum oven at 65°-75° C. for a minimum of 72 hours. Oxygen permeability measurements were performed on an OXTRAN 1000 instrument.

In Examples 1-5 below, the oxygen permeabilities of DMBPC-based polyarylates, bisphenol A (BPA)-based polyarylates, and polyarylates prepared from a mixture of DMBPC and BPA, were measured and compared. The effects on oxygen permeability from using terephthaloyl dichloride and isophthaloyl dichloride alone or in combination were also measured and compared. The polyarylate characterization data from these examples are shown in Table I.

COMPARATIVE EXAMPLE 1

Polyarylates were prepared with BPA rather than DMBPC as the bisphenol. The diacid composition is a mixture containing 50% terephthaloyl dichloride and 50% isophthaloyl chloride in the manner described above.

EXAMPLE 2

Polyarylates were prepared from a bisphenol mixture containing 50% DMBPC and 50% BPA and a diacid mixture containing 50% terephthaloyl dichloride and 50% isophthaloyl dichloride as described above.

EXAMPLE 3

Polyarylates were prepared from DMBPC, and a diacid mixture containing 50% terephthaloyl dichloride and 50% isophthaloyl dichloride in the manner described above.

EXAMPLE 4

Polyarylates were prepared from DMBPC and from a diacid mixture containing 10% terephthaloyl dichloride and 90% isophthaloyl dichloride in the manner described above.

EXAMPLE 5

Polyarylates were prepared from DMBPC and terephthaloyl dichloride in the manner described above.

In Table I below, "TPA" refers to terephthaloyl dichloride, "IPA" refers to isophthaloyl dichloride, and "PrO$_2$" represents oxygen permeability.

TABLE I

| | Bisphenol Composition | | Diacid Composition | | | | | |
|---|---|---|---|---|---|---|---|---|
| Example | DMBPC | BPA | TPA | IPA | Mw$^a$ | Mw/Mn | Tg (°C.) | PrO$_2$$^b$ |
| 1 | — | 100 | 50 | 50 | 59,000 | 3.20 | 195 | 425 |
| 2 | 50 | 50 | 50 | 50 | 168,000 | 2.44 | 207 | 125 |
| 3 | 100 | — | 50 | 50 | 98,000 | 2.51 | 193 | 73 |
| 4 | 100 | — | 10 | 90 | 87,000 | 3.80 | 181 | 58 |
| 5 | 100 | — | 100 | — | 109,000 | 4.51 | 232 | 103 |

$^a$Molecular weight are measured by GPC using two Linear Ultrastyragel columns calibrated against polystyrene standards
$^b$Oxygen permeabilities are measured at 25° C., 0% relative humidity, and are reported in the following units:
$$\frac{(cm^3\ O_2)\ (mil)}{(100\ in^2)\ (24\ h)\ (atm)}$$

High molecular weight, monodisperse polymers were formed in all five examples above. As can be seen from Comparative Example 1 and Examples 2 and 3, the replacement of Bisphenol A with DMBPC leads to a significant reduction in the oxygen transmission rate (PrO$_2$) of the resulting polymers. Although there is over a 6.5 fold decrease in permeability between compositions 1 and 3, it was hoped that further improvement in this moderate barrier material could be attained by variation of the diacid composition. Thus, in Examples 4 and 5, DMBPC polyarylates were prepared using different molar ratios of isophthaloyl dichloride and terephthaloyl dichloride. The DMBPC-terephthaloyl dichloride homopolyarylate formed in Example 5 had a higher oxygen permeability than the DMBPC polyarylate prepared from a 50/50 molar mixture of diacides in Example 3. However, DMBPC polyarylate prepared using predominantly isophthaloyl dichloride (Example 4) had a lower permeability than the DMBPC polyarylate prepared in Example 3. Taken together, Examples 3, 4 and 5 indicate that an increasingly large ratio of iso/terephthaloyl diacid units lowers the permeability of the DMBPC polyarylate.

The compositions prepared in all five examples above formed clear, ductile films when solution cast from dichloromethane. In addition, replacement of BPA with DMBPC did not significantly reduce the glass transition temperature of the resulting polyarylates.

In conclusion, these examples demonstrate that the barrier properties of polyarylates containing DMBPC are superior to those of bisphenol A-based polyarylates.

While the present invention has been described with reference to particular embodiments thereof, it will be understood that numerous modifications may be made by those skilled in the art without actually departing from the spirit and scope of the invention as defined in the appended claims.

What is claimed is:

1. As an article of manufacture, a food or beverage item contained in a formed container or film wrap having oxygen barrier properties and comprising a thermoplastic polyarylate composition comprising recurring structural units of the general formula

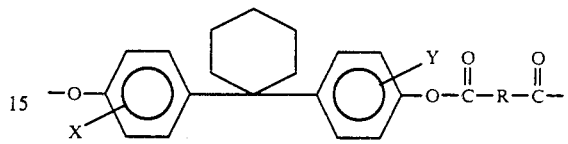

wherein R is an aromatic group, two or more aromatic groups connected through non-aromatic or divalent aliphatic-aromatic linkages, or a divalent aliphatic-aromatic group; and X and Y are each independently selected from the group consisting of hydrogen, an alkyl group having 1 to about 5 carbon atoms, a cycloalkyl group having about 5 to about 7 carbon atoms, a monovalent aromatic group, and a halogen; the molar proportion of said units of formula I being in the range of about 50–100 mole percent of total structural units.

2. An article according to claim 1 wherein X and Y are both methyl groups.

3. An article according to claim 2 wherein X and Y are methyl groups in the 3,3' positions of the aromatic with respect to the cyclohexylidene group.

4. An article according to claim 1 wherein R is a divalent aromatic group.

5. An article according to claim 4 wherein R is a meta-phenylene or para-phenylene group.

6. An article according to claim 5 wherein of the total R groups about 1 to about 99 mole percent are para-phenylene groups and about 99 to about 1 mole percent are meta-phenylene groups.

7. An article according to claim 6 wherein of the total R groups about 1 to about 50 mole percent are para-phenylene groups and about 50 to about 99 mole percent are meta-phenylene groups.

8. An article according to claim 7 wherein of the total R groups about 1 to about 20 mole percent are para-phenylene groups and about 80 to about 99 mole percent are meta-phenylene groups.

9. An article according to claim 1 further comprising recurring structural units of the general formula

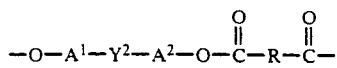

wherein each of $A^1$ and $A^2$ is a monocyclic divalent aromatic radical and $Y^2$ is a bridging radical in which one or two atoms separate $A^1$ and $A^2$.

10. An article according to claim 9 wherein $A^1$ and $A^2$ are each unsubstituted phenylene or substituted derivatives thereof, and $Y^2$ is a hydrocarbon radical.

11. An article according to claim 9 wherein $A^1$ and $A^2$ are each p-phenylene and $Y^2$ is isopropylidene.

12. An article according to claim 9 wherein the molar proportion of structural units of Formula (I) is in the range of about 80 to about 100 mole percent, based on total structural units of Formulas (I) and (II).